No. 784,411. Patented March 7, 1905.

UNITED STATES PATENT OFFICE.

GEORG MERLING, OF FRANKFORT-ON-THE-MAIN, AND ROBERT WELDE, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

MATERIALS FOR PERFUMES AND PROCESS OF MAKING SAME.

SPECIFICATION forming part of Letters Patent No. 784,411, dated March 7, 1905.

Application filed April 6, 1903. Serial No. 151,390. (Specimens.)

*To all whom it may concern:*

Be it known that we, GEORG MERLING, Ph. D., professor of chemistry, residing at Frankfort-on-the-Main, and ROBERT WELDE, Ph. D., residing at Höchst-on-the-Main, Germany, citizens of the Empire of Germany, have invented a certain new and useful Process of Making Materials Intended for Perfumes, of which the following is a specification.

We have shown in our application of same date relating to the manufacture of oxy-cyclohexancarboxylic acids and their esters and oxy-cyclohexancarbinols (terpenglycols) that by reducing cyclohexenoncarboxylic acids with sodium and alcohol, cyclohexencarboxylic acids, besides oxy-cyclohexancarboxylic acids, may be obtained. In said application it is the sodium ethylate or caustic soda which when heated slowly eliminates water from the oxy-carboxylic acids. We have found that said elimination of water as secondary reaction occurs more readily and completely, either directly or indirectly, if the oxy-cyclohexancarboxylic acids or their derivatives are treated with certain acid agents, such as phosphoric anhydrid, phosphoric chlorid, potassium bisulfate, and the like.

*Example I—Manufacture of dimethylcyclohexencarboxylic acid,*

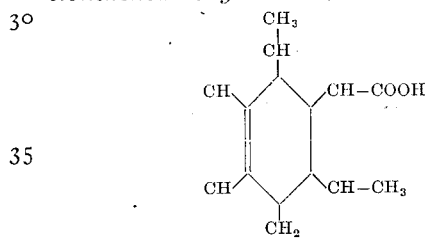

One part, by weight, of dimethyl-oxy-cyclohexancarboxylic acid ester, boiling-point 144° to 146° centigrade, (sixteen millimeters pressure,) is boiled with one part of pulverized potassium bisulfate for several hours in a vacuum with a reflux condenser. When cold, water is added, the oily dimethyl-cyclohexencarboxylic-acid ester is removed, dried, and purified by fractional distillation in a vacuum. Dimethyl-cyclohexencarboxylic-acid ester is a colorless thin liquid oil of an agreeable odor of flowers, boiling-point 89° to 91° centigrade, (twelve millimeters pressure.) The dimethyl-cyclohexencarboxylic acid obtained from it by hydrolysis with alcoholic potash is a thick oil, solidifying in the cold to a crystalline mass. The same dimethyl-cyclohexencarboxylic-acid ester is obtained if dimethyl-oxy-cyclohexancarboxylic-acid ester is distilled with phosphoric anhydrid.

*Example II—Manufacture of trimethyl-cyclohexencarboxylic acid from trimethyl-oxy-cyclohexancarboxylic-acid ester,*

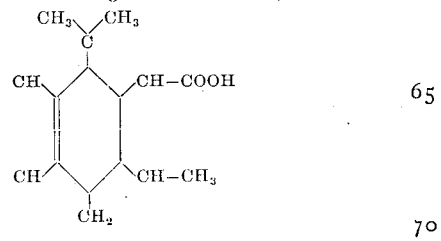

(The position of the double combination is not finally settled.) To a solution of forty-two parts of trimethyl-oxy-cyclohexancarboxylic-acid ester, boiling at 150° to 154° centigrade (seventeen millimeters pressure) in one hundred parts of absolute ether, is gradually added a mixture of fourteen parts of phosphorous trichlorid and thirty-nine parts of quinolin. The hydrochlorid of quinolin separates in crystals, heat being evolved, and with formation of the phosphorous anhydrid ester of trimethyl-oxy-cyclohexancarboxylic-acid ester which remains dissolved in the ether. Then ice-water is carefully added to the solution to decompose the excess of phosphorous trichlorid, and the ethereal layer is removed, washed with a solution of common salt, and finally with a solution of sodium carbonate, and dried with anhydrous sodium sulfate. After distilling the ether the phosphorous ester remains as a thick colorless oil, which when heated to 165° to 168° centigrade in a vacuum decomposes readily to phosphorous acid and trimethyl-cyclohexencarboxylic-acid ester passed over by distillation.

Trimethyl-cyclohexencarboxylic-acid ester is a colorless thin liquid oil, boiling at 95° to 98° centigrade, (thirteen millimeters pressure.)

The trimethyl-cyclohexencarboxylic acid obtained from it by hydrolysis with alcoholic alkali is a thick colorless oil, boiling without decomposing at 140° to 142° centigrade (fifteen millimeters pressure) and solidifying when cold to a colorless crystalline mass. The acid is probably a mixture of both isomerics:

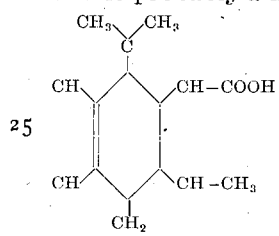 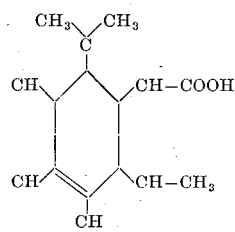

The acid is isomeric with Thiemann's alpha and beta cyclogeranium acid, (*Ber. d. d. Chem. Ges.* XXVI, 2725, and XXXIII, 3723,) having like the latter little acidity. For phosphorous trichlorid also phosphorous oxychlorid may be used with the same result.

*Example III—Manufacture of trimethyl-cyclohexencarboxylic acid from trimethyl-oxy-cyclohexancarboxylic acid.*—One hundred parts of trimethyl-oxy-cyclohexancarboxylic acid, boiling at 176° to 178° centigrade, (eight millimeters pressure,) and fifty parts of finely-ground potassium bisulfate are subjected to distillation in a vacuum on an oil-bath. At 110° to 130° centigrade (twelve millimeters pressure) eighty parts of a colorless oil pass over, consisting chiefly of nearly equal parts of lactone

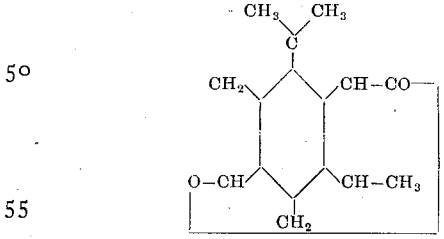

and trimethyl-cyclohexencarboxylic acid. The latter is isolated by shaking the distillate with dilute caustic-soda lye or a solution of sodium carbonate. The acid precipitated from the alkaline solution by a dilute mineral acid is purified by distillation in a vacuum.

*Example IV—Manufacture of trimethyl-cyclohexencarboxylic acid from trimethyl-halogen-(x)-cyclohexancarboxylic-acid ester,*

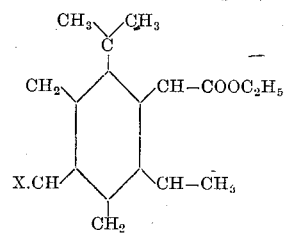

Trimethyl-oxy-cyclohexancarboxylic-acid ester cannot be transformed, or only slightly, by the halogen compound of phosphorus into the corresponding trimethyl-halogen-cyclohexancarboxylic-acid esters. The latter, however, are easily obtained by the action of halogen hydrid on trimethyl-oxy-cyclohexancarboxylic-acid ester and yield when heated with alcoholic potash trimethyl-cyclohexencarboxylic acid or their esters, according to concentration and temperature.

It is best to operate as follows: Trimethyl-oxy-cyclohexancarboxylic-acid ester is saturated with dry hydrogen bromid while being heated. The ester is then absorbing exactly one molecular proportion of HBr. By washing the oil with water and a solution of sodium carbonate the trimethyl-bromo-cyclohexancarboxylic-acid ester is obtained as a heavy oil. It is boiled with concentrated alcoholic potash for six to eight hours in a vessel with reflux condenser, and the solution is then diluted with water and the alcohol expelled with steam. Mineral acids precipitate the trimethyl-cyclohexencarboxylic acid from the cooled alkaline solution as an oil, which after being dried in an ethereal solution is purified with anhydrous sodium sulfate by distillation in a vacuum.

For hydrogen bromid may be used hydrogen iodid or hydrogen chlorid, the combination being less complete if the latter is used. The cyclohexencarboxylic acids and their derivatives obtained by the above-mentioned process are intended to serve as perfumes and as primary material to manufacture same.

Having now described our invention, what we claim is—

1. The process herein described of making cyclohexencarboxylic acids having the general formula

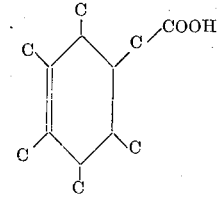

and their derivatives, which consists in treating the oxy-cyclohexancarboxylic acids having the general formula

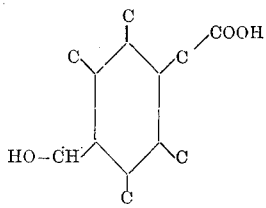

and their esters with dehydrating agents.

2. As new products cyclohexencarboxylic acids obtained from oxy-cyclohexancarboxylic acids having the general formula

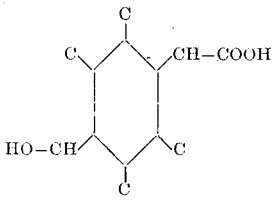

by eliminating water from the latter by means of dehydrating agents, like phosphoric anhydrid, phosphoric oxychlorid, potassium bisulfate; the cyclohexencarboxylic acids being colorless compounds, soluble with difficulty in water, readily soluble in alcohol, ether and benzene, caustic and alkali carbonates and distilling without decomposition in a vacuum.

3. As a new product, the trimethyl-cyclohexencarboxylic acid

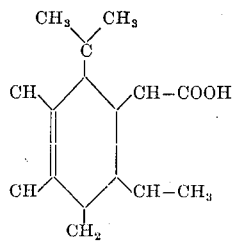

the position of the double combination not being definitely settled, a thick, colorless oil of acid reaction, immiscible with water, readily soluble in alcohol, ether, benzene, boiling at 140° to 142° centigrade under fifteen millimeters pressure without decomposing, said product being adapted for the manufacture of perfumes.

In testimony that we claim the foregoing as our invention we have signed our names in presence of two subscribing witnesses.

GEORG MERLING.
ROBERT WELDE.

Witnesses:
 ALFRED BRISBOIS,
 BERNH. LEYDECKER.